US009420253B2

(12) United States Patent
Baker

(10) Patent No.: US 9,420,253 B2
(45) Date of Patent: Aug. 16, 2016

(54) PRESENTING REALISTIC DESIGNS OF SPACES AND OBJECTS

(75) Inventor: Robert G. Baker, Boynton Beach, FL (US)

(73) Assignee: Image Masters, Inc., Boynton Beach, FL (US)

( * ) Notice: Subject to any disclaimer, the term of this patent is extended or adjusted under 35 U.S.C. 154(b) by 92 days.

(21) Appl. No.: 14/410,486

(22) PCT Filed: Jun. 20, 2012

(86) PCT No.: PCT/US2012/043335
§ 371 (c)(1),
(2), (4) Date: Dec. 22, 2014

(87) PCT Pub. No.: WO2013/191689
PCT Pub. Date: Dec. 27, 2013

(65) Prior Publication Data
US 2015/0325038 A1    Nov. 12, 2015

(51) Int. Cl.
*H04N 13/00* (2006.01)
*G06Q 30/06* (2012.01)
*G06T 15/20* (2011.01)
*G06T 15/50* (2011.01)
*G06T 15/60* (2006.01)

(52) U.S. Cl.
CPC ....... *H04N 13/0007* (2013.01); *G06Q 30/0621* (2013.01); *G06Q 30/0643* (2013.01); *G06T 15/205* (2013.01); *G06T 15/50* (2013.01); *G06T 15/60* (2013.01)

(58) Field of Classification Search
None
See application file for complete search history.

(56) References Cited

U.S. PATENT DOCUMENTS

| | | |
|---|---|---|
| 2004/0109009 A1 | 6/2004 | Yonezawa et al. |
| 2005/0001852 A1 | 1/2005 | Dengler et al. |
| 2008/0213732 A1 | 9/2008 | Manard et al. |
| 2010/0287511 A1* | 11/2010 | Meier ................ G06T 15/20 715/848 |
| 2010/0289817 A1* | 11/2010 | Meier ................ G06T 15/20 345/619 |

OTHER PUBLICATIONS

"Virtual Staging | Virtual Home Staging", http://www.realtourvision.com/virtual-home-staging.html, archived on Apr. 13, 2012, retrieved on May 13, 2016 from https://web.archive.org/web/20120413150558/http://www.realtourvision.com/virtual-home-staging.html.*
International Preliminary Report on Patentability dated Dec. 23, 2014 received for PCT application No. PCT/US2012/043335.

* cited by examiner

*Primary Examiner* — Zhengxi Liu
(74) *Attorney, Agent, or Firm* — Fleit Gibbons Gutman Bongini Bianco PL; Jon A. Gibbons

(57) ABSTRACT

A novel system and method of presenting realistic designs of physical objects in real spaces employing stereoscopic-3D (three-dimensional) photographic images. The method visually integrates images of objects with images of customer-specified interior or exterior spaces using software to manage the process in 3D space, yielding stereoscopic-3D photographic images of design decisions. The system includes: stereoscopic-3D images, some of which are omnidirectional; software, a computing system and display for viewing and combining multiple stereoscopic-3D images; and a data management system for maintaining and creating appropriate customer-specified views of vendor goods available for integration.

20 Claims, 11 Drawing Sheets

PRESENTING REALISTIC DESIGNS OF SPACES AND OBJECTS

FIELD AND THE INVENTION

The present invention relates to the field of computer-assisted production and manipulation of photographic images and more specifically, capturing stereoscopic-3D (three-dimensional) photographs of real-world customer-specified indoor or outdoor locations and integrating stereoscopic-3D photographs of selected objects within them.

BACKGROUND OF THE INVENTION

There is a limited portion of the human population that is capable of visualizing scenes and objects in their minds without directly viewing them concurrently. People readily comprehend elements at which they are actively looking, but they can rarely integrate in their minds views of multiple objects from different perspectives acquired at different times. This limited human visualization capability makes it difficult or impractical for a prospective purchaser to determine in advance whether specific items are suitably beneficial so as to justify purchasing them. This is particularly important with respect to home or office furnishings and outdoor plants and décor, given the variety of fabrics, patterns, finishes, plant types, colors and spaces from which to choose. The conventional design process currently associated with living or working spaces relies upon a customer's ability to perform this internal visualization with only sketches or computer-generated images (CGI). For most people, CGI is noticeably artificial in comparison to real photographs.

Even with excellent artistic and technical skills, a designer can fall short of adequately showing prospective customers the actual appearance of the end product of the design experience until the installation is complete. Hand-drawn sketches show a limited or artificial view of how things might look together and lack the texture and realism of actual photographic images. Traditional 2-dimensional computer-generated images also fall short of the realism and attractiveness of stereoscopic 3-dimensional photographic images.

The failure to accurately portray the effect of a new design within existing spaces often results in a mismatch between customer expectations and the delivered product. Customer dissatisfaction can require re-stocking and additional labor, both of which are financially negative for businesses and frustrating for customers. Accordingly, there is a need for a system and method of presenting realistic interior and exterior designs that aids customers in visualizing the results of a design process. There is further the need for a product selection process that provides vendors a cost-effective way of promoting their products in a compelling fashion. There is a further need for automating key portions of the preparation process to make them more efficient.

SUMMARY OF THE INVENTION

The system and method are designed to support the fields of interior and exterior design, architecture, and related fields. The method integrates photographic images in order to present a fully realistic photographic image that could exist if the photographed physical objects were placed in the customer-specified locations. If actual customer-specified location photographs are not available, generic location photographs are substituted. In either case, the photographs are stereoscopic-3D. To achieve the highest levels of realism, photographic images of objects being integrated are:

(a) associated visually with appropriate contact planes so that objects do not appear to float in space or physically interfere with other objects in the actual location;
(b) scaled accurately in size to match the scale of represented locations in which they are being placed;
(c) matched in resolution to the resolution of the integration position in the location photograph;
(d) presented in whole or in part based on the visibility of each pixel from the perspective of the image capture device;
(e) selectively illuminated and shaded appropriately for the location photograph setting; and
(f) managed and presented preferably using stereoscopic three-dimensional imagery and display devices so they provide true visual depth-of-field.

For clarity in discussions, the term "image" when discussing a stereoscopic image means that visual content for both left and right eyes is joined but still called a single image. For example, a stereoscopic-JPEG image has a file extension of ".JPG" or ".JPS" and connects the left and right images in side-by-side fashion to form a wide JPG image. The term "image set" refers to collections of images related to a given object or location. For example, the image set of a chair includes stereoscopic-3D images of the chair from many sides and angles. An image set at a given location includes stereoscopic-3D views in many directions as taken from a camera or image capture device at that spot.

The field of stereoscopic imaging has been in existence since the 1800s. Early devices are characterized by the generation and presentation of stereoscopic images that provide a separate view to each eye. Some images and their associated technologies have been called "three-dimensional" (3D) even though they present no true visual depth-of-field. It is characteristic of these so-called "3D images" that they represent 3D space but only show perspective views of scenes constituted of a single image and viewpoint. As such, a person's left and right eyes see the same scene, and there is no depth perception associated with the images.

It is therefore important to distinguish between the aforementioned and images that present different views to each eye. For the present discussion, the aforementioned image type that presents only a single viewpoint is termed "perspective-3D". A perspective-3D image is in reality a two-dimensional (2D) image, and it may be readily viewed on traditional computer monitors of the current era. Such an image is distinguished from "stereoscopic-3D" images, in which separate views are captured for and presented to each eye, giving a sense of visual depth in the perception. To be fully appreciated for their content, stereoscopic-3D images are viewed with a stereoscopic viewing device that presents different images to each eye. Examples of such stereoscopic-3D display devices are the early stereoscopes, and more recently, View-Masters, 3D TVs (3-dimensional television sets), autostereoscopic displays, 3D digital cameras and stereo head-mounted-displays (HMD).

It is also important to distinguish between "photorealistic" and "photographic". Photorealistic images are CGI images generated by graphics programs or CAD software. They usually have high resolution and appropriate lighting and shading such that they give a superficial appearance of a photo. They usually present a view of a scene in such fashion that it appears somewhat "real". The better the rendering of the image, the more "photorealistic" it may appear. This is in contrast with actual photographs, which are originated in digital file formats or scanned from film to allow presentation on electronic displays. A distinct difference between photorealistic renderings and actual photographs is readily apparent to most observers.

The system and method presented herein overcome the limitations of prior art by using actual photographs of a customer's own indoor or outdoor spaces combined with actual photographs of indoor or outdoor furnishings. The purpose of this advance is to provide realistic-looking photographs of possible combinations of physical objects in order to help viewers visualize what the result will look like without physically assembling the combination. A practical example of its application is the field of interior design and its generation of new visualizations of home and office spaces and their contents. Furniture, furnishing accessories, artwork, appliances, cabinetry, floor and wall coverings, countertops, doors, windows, shelving and color/texture treatments of surfaces are examples of objects that can be combined with existing room settings to provide a different living or working space. Similarly, bushes, flowering plants, trees, gazebos, fountains, walkways, fencing, patios and yard ornaments are examples of objects that could be integrated into outdoor spaces. Further, actual photographs of spaces chosen by customers and users customize the results to the interests of specific individuals and provide the greatest value to them.

An alternative to real images of the customer's space is a generic stereoscopic-3D photographic image set similar to the customer's space in size and shape. Whether the customer's own space image set or a generic image set is used, the result is a representative image set that is captured and displayed in highly realistic stereoscopic-3D format with all the desired elements, enhancing the design and purchase decision process.

The system and method presented herein provide a mechanism for improved visualization of possible location design changes, facilitating commerce involving associated services and goods available for purchase and enhancing the salability of such goods. Similar benefits of the technology are applicable but not limited to the fields of landscape design, office and factory space planning, architecture, construction and commercial advertising/promotion, among other fields of endeavor.

Placement of objects and observance of physical rules are facilitated through the use of 3D models of customer-specified locations and the objects being integrated. There are numerous techniques for acquiring or generating 3D models of spaces, which are defined herein as including the objects within the spaces. These techniques range from simple physical measurement to photogrammetric methods known to those skilled in the art. One mechanism to generate the 3D model of the real space takes advantage of the dual-perspective nature of stereoscopic image pairs, in which the stereoscopic-3D photographic images or image data sets are preferably analyzed using triangulation formulas. While triangulation or other photogrammetric techniques are practiced as part of this method, any technique that provides dimensional data for 3D models is workable and functional. Use of 3D models improves over prior art techniques for filling in images when visual portions of the images have been removed. The prior art method is to select from areas around a removed object in a 2D or perspective-3D photograph, presuming that the areas are necessarily part of the background behind the object. The system and method presented herein determine appropriate surface areas behind an object by analysis of the 3D model of a space. The 3D model defines the correct areas to use to fill in based on the viewpoint of the camera and the position of planar surfaces and other objects that are known in the model.

An important capability of this system and method is the providing and displaying of actual (non-CGI) photographs of purchasable objects integrated with actual (non-CGI) photographs of customer-specified settings, and providing these in stereoscopic-3D formats that give a sense of viewing an actual scene with true visual depth-of-field. It is known that photographic editing programs have been readily available for years for manipulating and merging portions of images. Two such examples are Photoshop™ and Photoshop Elements™ (trademarks of Adobe Systems, Inc.), which allow many techniques for modifying, enhancing, and merging of photographic content. Tools within these program products allow users to selectively overlay, distort, colorize, highlight, adjust, crop, delete and fill in visual components of one of more images, merging portions as the user sees fit. The majority of these functions are manually performed, so some training, skill and lengthy time allocations are needed to achieve good results. A significant limitation is that these programs operate only on 2-dimensional photographs; they are not currently capable of handling image components in 3 dimensions.

There are benefits incumbent in this method and system of realistic design presentations. With stereoscopic-3D photographic images of goods maintained in a widely accessible database, producers and sellers of design goods gain the opportunity for visibility of their products on a widespread geographic basis without having to build a multitude of retail stores. Access to customers that may include design service providers potentially increases overall sales through integration of goods in customer-specified designs. Database-supported virtual showrooms extend product visibility and marketing to customers beyond the limited geographical boundary supported by bricks-and-mortar storefronts.

The present method excels over existing 2-dimensional hand-drawn and computer-generated design presentations by incorporating stereoscopic-3D photographs into stereoscopic-3D photographs of a customer's own space. The method overcomes the visualization problem by showing final configurations exactly as they will look in stereoscopic-3D photographic (rather than CGI) form. The presentation of retail products in images of actual customer spaces using such stereoscopic-3D photographs provides the necessary realism to support personal design decisions about the respective purchasable objects or goods.

A system and method of presenting realistic designs employing stereoscopic-3D photographic image sets that are either of normal or omnidirectional fields-of-view is defined herein. This method for preparing designs integrates stereoscopic-3D images of physical objects with stereoscopic-3D images of customer-specified spaces.

Initially, stereoscopic-3D photographic images of objects are captured from multiple viewing angles, and the image sets are saved in a database along with metadata for the object. Such metadata includes dimensional information and other selective descriptors related to the object. Examples of metadata are materials used, name of manufacturer, supplier or distributor, price and availability. The metadata selectively included is related to purposes of interior design or architecture. In the case of outdoor goods, such metadata could be selected from the group of dimensions, bucket size, flowering month, square feet, sun tolerance, price and availability, among other descriptors. A service provider or other user captures a stereoscopic-3D image set of a space selected by a prospective client or customer. This image set includes fields-of-view from limited perspective up to and including omnidirectional coverage of the space.

The system software provides a number of functions in performance of its tasks. They include accessing databases, viewing and selecting furniture object images from the database, placing the furniture in images, generating interpolated images of furniture pieces that are selectively further adjusted for scale and resolution, building 3D models of spaces and objects, and changing characteristics of real space images. The software performing these functions may be organized jointly or individually as desired to match various configurations of hardware, software, communications and mobility needs of assorted clients. It may be contained and operated from individual computing system units or distributed in subsections across several platforms as may be deemed more effective or beneficial to individual clients. Partitioning of software functions may be done based on efficiency, flexibility, cost or other considerations of respective clients. System software may thus be structured in several different ways as discussed in FIG. 9 and its description. FIG. 9 is not meant to be limiting in its scope.

Analysis of the images or measurement of the customer-specified space allows construction of a 3D model of that space with a known position of the image capture device. Using a local view-and-select portion of the system software, a standalone system application, or a view-and-select browser plug-in, a user selects an object from a database of objects, each object of which is characterized by metadata and multiple stereoscopic-3D views. In operation, the view-and-select software portion of system software on the local computing system conveys camera viewpoint information to a viewpoint portion of the system software that provides a properly-scaled and resolution-matched stereoscopic-3D photographic image and 3D object data of the object back to the view-and-select software over a network or the Internet. System software performs dimensional integration based on user selections and positioning of a representation of the object in a representation of a 3D model of the customer-specified space, observing rules related to the physical realities of the real world that the photographs represent. Such rules cause objects to be displayed on appropriate planar surfaces so they do not appear to float in space or interfere with other physical objects in the space. The software also recognizes the position and orientation of objects in the three-dimensional space in relation to the viewpoint of the image capture device. The position of the image capture device becomes at least one of the viewpoints that is displayed to users. The software handles relative positions of objects and provides or occludes views of each pixel as appropriate. The resolution of the photographic object being integrated is matched to the resolution of the portion of the image into which the object is being inserted. Resolution matching is done through interpolation techniques known in the art, such as linear, spline or multivariate interpolation. Lighting and shadows are appropriately applied to further enhance the realism of the stereoscopic-3D photographic images. The resultant images are presented to the user or others preferably in stereoscopic-3D form using displays capable of rendering true visual depth-of-field.

Another example of the system and method employs a local computing system for the user to access remote versions of the system software and programs structured as a software-as-a-service offering. The user performs his selection and placement tasks identically, and images are still displayed the same. The only difference is the computing system on which the computational tasks are done. With this example, many users may be engaged in design activities on various computer systems at the same time, transparent to individual users.

In another example of the system and method, additional omnidirectional stereoscopic-3D photographic image sets are selectively captured in the same customer-specified space but from different image capture device locations or positions. In this example, a new properly-scaled and resolution-matched stereoscopic-3D photographic image set and 3D object data of the object is provided to the user. The new image set and data use the selection and positioning information from the user in combination with knowledge of the 3D model to prepare the appropriate view based on the viewing angle of this image capture device position. Integration of the object image with recognition of relevant occlusions is performed as before, and lighting and shading are applied as appropriate to complete the image. As before, the resultant images are presented to the user or others in stereoscopic-3D form using displays capable of rendering true visual depth-of-field.

It is one advantage of the system and method that it provides an enhanced method for presenting highly realistic stereoscopic-3D photographic images of customer-specified interior or exterior spaces.

It is another advantage of the system and method that it defines a system for producing customer-specified high-resolution stereoscopic-3D photographic images of customer-specified interior or exterior spaces with fields-of-view up to and including omnidirectional coverage.

It is another advantage of this system and method that it provides and displays photographs of purchasable objects or goods integrated with photographs of customer-specified settings. It provides these photographs in stereoscopic-3D formats that give a sense of viewing an actual scene with true visual depth-of-field.

It is another advantage of the present system and method that it is capable of visually removing objects from the images of the customer's spaces.

It is a further advantage of this system and method that it fills in imagery for removed visual objects by accurately defining the background visual content in relation to a given image capture device position.

It is yet another advantage of the system and method that it defines techniques for the production of high-resolution stereoscopic-3D photographic images of vendor interior or exterior design and landscaping products and inventory.

It is another advantage of the system and method that it is able to produce and maintain an easily and widely accessible database of high-resolution stereoscopic-3D photographic images of vendor goods, including such goods as interior or exterior design and landscaping products and inventory.

It is yet another advantage of this system and method that the same stereoscopic-3D photographic images that are used to present different views of interest to prospective customers are used to generate the 3D models of the purchasable objects or goods. It is a further advantage that these same images are used to generate images with correct viewpoint orientation for dimensional integration with a customer-specified photographic image. These advantages give a high utilization efficiency for the system and minimize the need for additional storage. It is another advantage that the 3D models of spaces are generated from a single imaging system capture location.

It is yet another advantage that correct-viewpoint-oriented images are generated as needed and not stored unless requested by a user, saving storage space.

It is yet another advantage of this system that selection and positioning of vendor goods into representative images and image sets of customer spaces are accomplished on standard 2-dimensional displays as well as stereoscopic-3D display devices.

It is a further advantage of this system that the system includes tools and software that visually capture and measure entire spaces at one time with omnidirectional stereoscopic-3D images.

It is yet another advantage of this system and method that it provides a system and method whereby individuals can easily combine elements of images in such a way as to prepare visually-realistic photographs of settings that have not yet been physically configured.

DETAILED DESCRIPTION OF THE INVENTION

In the following detailed description, specific examples are described with reference to the accompanying drawings that form a part hereof. These examples describe the system and method in sufficient detail to enable those skilled in the associated arts to practice the invention. It should be understood that these are examples only, and they should not be taken as limiting. Other examples may also be practiced that are consistent with the spirit and intention of the present system and method and apparent to those skilled in the associated arts, and the scope is defined by the appended claims and their equivalents.

The terms "a" or "an", as used herein, are defined as one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

A system and method for presenting realistic designs employing stereoscopic-3D photographic images is described herein. These stereoscopic-3D images may be either limited in field-of-view coverage or may be omnidirectional in scope. Stereoscopic-3D images necessarily include left-eye and right-eye visual content. The present method is more efficient for capturing image information, lowers the amount of information that must be transferred between computing systems, and presents designs realistically, among other benefits. A field of use is described with respect to interior design by way of example, but other implementations may be similarly applied to other fields of endeavor.

Figure 1:
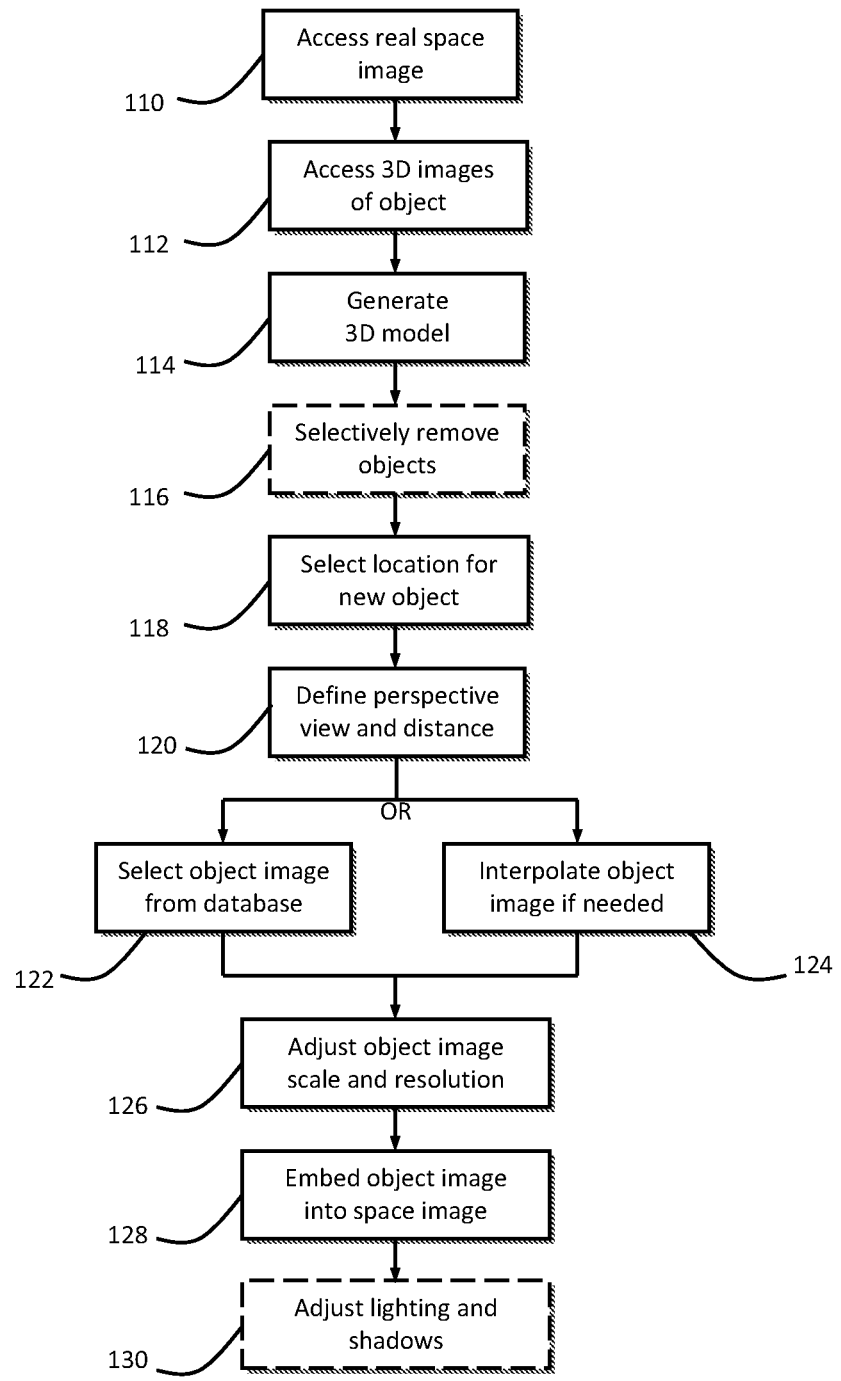
FIG. 1 shows the overall steps in the method of preparing realistic designs according to the system and method described herein.

FIG. 1 outlines the steps for preparing and presenting realistic stereoscopic-3D photographic images and image sets as they are used in an example of an interior design application. This process presumes the existence of a stereoscopic-3D image set of a real space and a stereoscopic-3D image set of one or more physical objects. In the application shown in this figure, an example of a real space is a room in a customer's home, and the objects are pieces of furniture. In the context of this interior design example, representative objects include furniture like couches, chairs or tables, artwork, accessories, floor or wall coverings, or other interior design elements. In the context of interior design, examples of users include an interior design or marketing professional, photographic service provider, architect, space planner, manufacturing staff member, retail associate, or end customer, among others. The operational simplicity of this system and method presents no difficulty to prospective users, so this group is not limited to professional designers alone. To begin the process, a user accesses at least one stereoscopic-3D image or image set of a customer's space in 110. This image set may be limited to the field-of-view normally captured by typical cameras (about 45° horizontally) or may cover an omnidirectional field-of-view. To show customer spaces in their totality, such stereoscopic-3D image sets preferably are omnidirectional collectively in their field-of-view or scope of visual coverage. Omnidirectional coverage may be constituted of numerous right-eye and left-eye pairs of images or continuous right-eye and left-eye omnidirectional images. The image is accessed to view an area in which design changes are to be made based on user preferences.

In lieu of actual customer-specified location photographs, a generic stereoscopic-3D photographic image set similar to the customer's space in size and shape is substituted. The omnidirectional stereoscopic-3D photographic images may be used as-is, enhanced through image enhancement techniques, or further modified to suit the user's purposes. One such purpose is to modify the images in the generic image set to more closely match the characteristics of a given customer-specified space, such as to shorten or lengthen wall spans or heights or change the size of the generic space. Colors of walls, trim, or other objects in the room are also changed using existing image manipulation software tools available on the market such as Photoshop or Paint Shop Pro.

Figure 2:
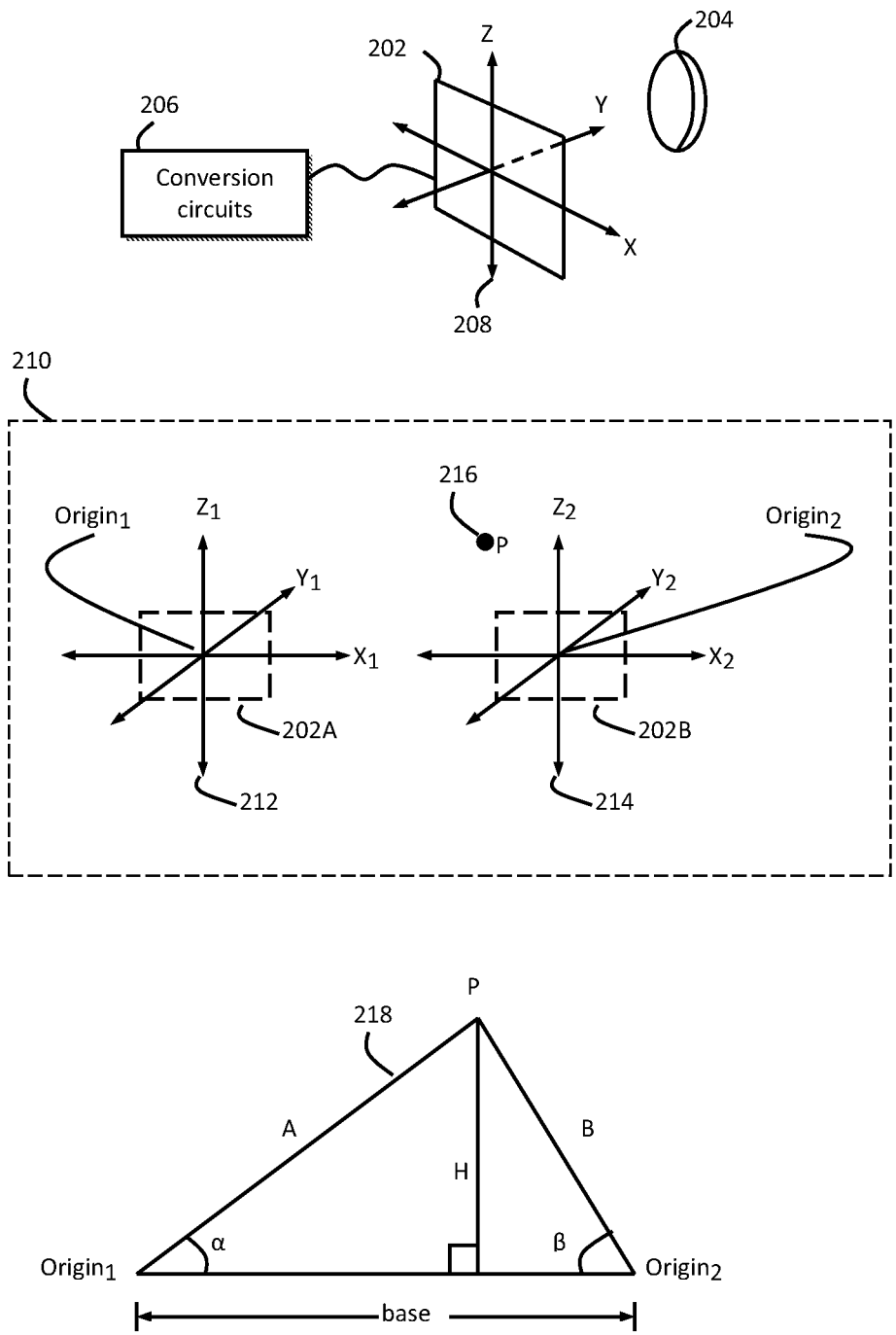
FIG. 2 illustrates an example of triangulation calculations as used in the method.

The user accesses stereoscopic-3D images of objects in step 112 to choose an object for incorporation into a design scheme. The image data sets for objects that include stereoscopic-3D images are supplemented by metadata. Such metadata for furniture includes information such as dimensions, finish options, source of supply, price, or availability, among other descriptive data as are appropriate for a given type of object. The dimensional component of metadata may be acquired by manual measurement using conventional measuring devices, but it is derived preferably from analysis of multiple images of the object. Such an analysis uses triangulation methods that take advantage of the stereoscopic-3D imagery acquired from multiple perspectives to construct a 3D model, point cloud or depth map of the object. Diagrams illustrating a trigonometric method for performing triangulation are shown in FIG. 2. Object image data sets and metadata are managed selectively in a single database or in separate databases for individual suppliers, manufacturers or others, as may be commercially beneficial.

A 3D model of the real space is generated in 114. In its simplest form, this 3D model is the collection of data describing locations and extents of planar and object surfaces for a given space and its contents. One method for performing this is by manual measurement of the space with measuring devices such as tape measures, laser or ultrasonic ranging devices. An alternative technique for measuring the space is structured light analysis, and other methods are known to those skilled in the art, such as laser stripes or time-of-flight measurements. The location and height of the image capture device from which point the omnidirectional image set is captured is also recorded as part of the model. This camera viewpoint information includes the spatial location of the stereoscopic-3D image capture device in real space, its direction of view for a given subset of the omnidirectional image set, and resolution data for the scene behind the embedded object. If manual measurements are employed, the angle-of-view of the image capture device for each image subset of an omnidirectional image set is also recorded with the image capture device's positional information. A preferred method for acquiring dimensions efficiently with the present system is the use of triangulation based on analysis of elements in the stereoscopic-3D image pairs in a given image data set. A calibrated imaging system with known parameters allows triangulation of each point and the construction of a 3D model of the space that identifies planar surfaces and objects. In the event that generic-space images are used, the 3D model and positioning of an image capture device are defined by the user instead of a real space being measured.

Although full stereoscopic-3D images of objects are available and preferable for more compelling customer viewing, a user preferably views a representation of the object and the 3D model on a standard 2D viewing display for doing the design work. The representation of the object is a wire-frame, 2D line outline drawing, perspective-3D image or other format suitable for use with the representation of the 3D model. The file sizes for such representations are smaller and faster to process in computing operations. The 3D model is preferably shown as a plan view for simplicity. Other depictions such as 2D drawings or perspective-3D CGI images are alternatively used. Either a left-eye or right-eye image of a given stereoscopic-3D image serves as a 2D or perspective-3D image. Alternatively, a centered view generated from the pair of images can be used. These types of visual representations are chosen from among those that are in common use for depicting furnishings in rooms or objects in indoor or outdoor locations, depending on context of the application.

In the case of interior design, it is advantageous to start with an empty space, but many design activities are based on occupied spaces. One way to achieve an empty space is to physically remove the unwanted furnishing items prior to acquiring the photographs of the customer space. However, it may be impractical to do that or the customer may make decisions after images of a room are acquired. There are cases in which it is desirable therefore to visually remove objects from the images of the customer space as is selectively practiced in this methodology. Shown as optional step 116 in FIG. 1, this operation is explained in more detail in FIG. 4.

On the basis of customer preferences, the user then selects a location for an object to be inserted as step 118, rotating or positioning the object as desired. A coordinate location for the object corresponding to the positioning selection is determined in the coordinate system of the 3D model. Each 3D model defines contact planes and surfaces that represent the planes and surfaces of the real world. Rule-based portions of the system software associate one or more contact points or contact surfaces of the object with an appropriate contact plane in the 3D model and ensure that two objects do not overlap in such a way as to occupy the same space. For example, a chair's contact points would be associated with the floor contact plane, and a painting's contact point would be associated with a wall contact plane. Furthermore, an inserted object selectively placed next to an existing object in the 3D model is prevented from impinging on the existing object's volume. Any minor adjustments that are made by the software to prevent overlapping of physical objects are reflected in the coordinate values for the inserted object and the integrated images resulting from the embedding process.

In step 120, the camera viewpoint information combines user-selected object positioning information with the image capture device's angle-of-view information to define the appropriate perspective view and distance from the image capture device to the object that is to be integrated into the customer-specified space image. The camera viewpoint information also includes resolution data for the selected background image view. The positioning information includes the object's location within the 3D space and its rotational orientation with respect to other objects and structures in the 3D space. After the perspective view and distance have been determined, view-and-select software that is part of the computing system local to the user transmits camera viewpoint information to a viewpoint program that is part of system software. This program preferably operates on a computing system that is associated with the object image database. In one example, that computing system is a server that also manages the image database(s). View-and-select software is optionally configured as a standalone application on a local computing system, or its functions can be alternatively configured in various hardware/software architectures as browser-based, client-server, cloud-based, or another configuration as may be specified by client companies. The important features of any implementation of view-and-select software are accessibility of a user to its functions of viewing 2D and stereoscopic-3D images, selecting and positioning furniture, and viewing rooms and selectively modifying contents.

Figure 3A:
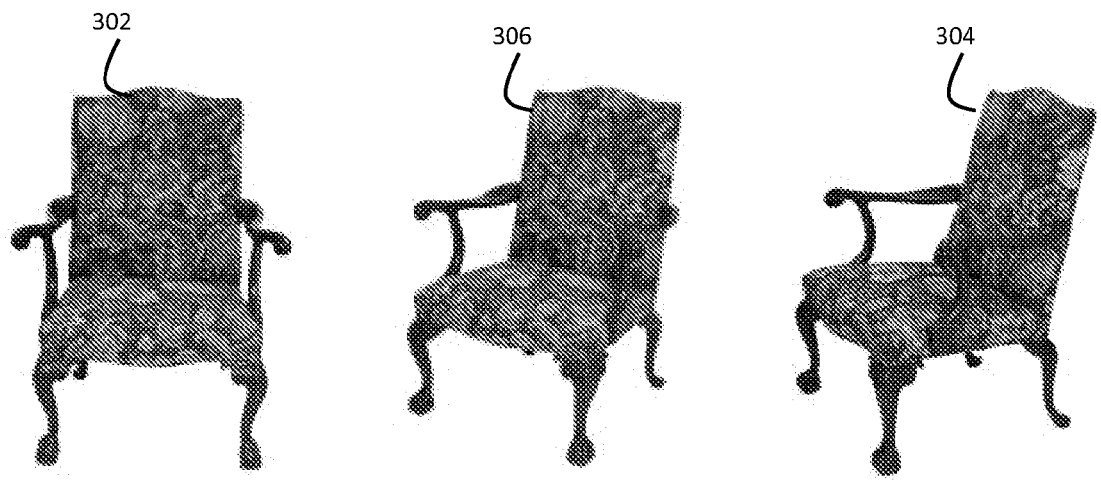
FIG. 3A shows two of a plurality of perspective-3D images of an example object and a representative perspective-3D image showing the outcome of an interpolation operation.

Based on the camera viewpoint information, a view of the object selected for incorporation is selected from the database of object images in step 122. This stereoscopic-3D view is the correct perspective of the object as it would be seen from the location of the image capture device in its acquisition of the image of the customer space. If the view that is needed does not match an existing object view in the database, a suitable stereoscopic-3D image is interpolated from two or more stereoscopic-3D images of the object in the database, as shown in 124. FIG. 3A shows two of a plurality of perspective-3D images of an example object and a representative perspective-3D image showing the outcome of an interpolation operation.

Each stereoscopic-3D image of an object has an image resolution based on the specific image capture device used to acquire the images and the object's distance from the image capture device. This is a known principle of optical image acquisition. Similarly, for each planar surface and object in an image of a customer's space, there is a corresponding resolution based on the image capture device and the surface/object distance from the image capture device. To ensure appropriate realism and make the inserted object appear to be part of the original image, the scale of the perspective view of the object is first adjusted to match its correct size for the scale of the location into which it is inserted. It is then further adjusted to match the resolution for the area into which it is being inserted, which takes into account its distance from and the perspective of the image capture device. These actions are shown as step 126. This is readily accomplished because the dimensions of the space and all associated objects are recorded in the 3D model of the space. The result of step 126 is a properly-scaled and resolution-matched stereoscopic-3D photographic interpolated image of a selected physical object. Once the stereoscopic-3D image of the object is thus adjusted, it is embedded in the stereoscopic-3D images of the real space as shown in 128.

As part of the embedding process, the system software determines whether occlusions exist for the object being inserted based on its placement in the 3D space and the image capture device's vantage point. Based on this determination, the system software defines which pixels to include from each of the interpolated object image and the stereoscopic-3D images of the customer-specified space. The software recognizes the position and orientation of objects in the three-dimensional space in relation to the viewpoint of the image capture device. The information about the portions of objects that are closer to the image capture device allows the software to manage occluded views of each pixel as appropriate. Upon completion of the visual integration step, lighting and shadow effects are selectively applied to the resultant stereoscopic-3D photographic image in step 130 to further enhance the realism of the image. The lighting and shadow effects are related to the newly inserted object with its effect on the dispersion of light in the scene. Another advantage of an omnidirectional image data set of a space is the information acquired about light sources within the space. The result of steps in FIG. 1 is a realistic stereoscopic-3D photographic image set of a customer's space with a user-selected, properly-scaled and resolution-matched object embedded into one or more images in the set.

One technique for acquiring dimensions and developing 3D models of objects and real spaces as described herein is triangulation using the stereoscopic-3D image data sets identified as elements herein. A brief discussion of triangulation calculation techniques with respect to practical imaging systems follows. The triangulation techniques are equally applicable regardless of the coordinate system used to describe them (e.g. spherical; Cartesian). The three-dimensional Cartesian coordinate system (x, y, z) is used in this discussion.

Referring to FIG. 2, a typical digital imaging system is defined as including a planar image sensing array 202, an optical system 204, and circuits 206 to convert the output of the light falling on the array into meaningful information in a useful format. For the sake of this discussion, it is assumed that this output is digital data related to the incidence of light on the sensing array. The method can be accomplished in similar fashion with film in place of the imaging array and manual measurement of objects in the photographs. For an ideal imaging system, the optical system transmits each ray of incident light in its field-of-view to a given location on the sensing array or film. 208 is a Cartesian coordinate system superimposed on the plane of the imaging array 202 of a representative imaging system. In this example, the X and Z axes align with the plane of the imaging array, and the Y axis extends out in front of and behind the array. The optical characteristics of an imaging system are characterized through design, analysis or empirical testing and calibration. For a given lens implementation, the ray tracing formulas of the optics provide known angles with respect to the optical center of the lens for any photons sensed in the field-of-view. The distance to the light source cannot be known with an ordinary scene of incident light (i.e. not structured light) falling on a single imaging system. However, for a stereoscopic-3D imaging device, it is possible to determine the distance to all points visible to both imaging subsystems. 210 is a representation of such a stereo-optical imaging system with two subsystems. A first three-dimensional Cartesian coordinate system 212 ($X_1$, $Y_1$, $Z_1$) is aligned with a first imaging subsystem (shown as 202A) and a second three-dimensional Cartesian coordinate system 214 ($X_2$, $Y_2$, $Z_2$) is aligned with a second imaging subsystem (shown as 202B). Through intentional design, the $X_1$-$Z_1$ and $X_2$-$Z_2$ planes lie on the same plane and the $X_1$ and $X_2$ axes lie on the same line. By definition, the $Y_1$ and $Y_2$ axes are parallel to each other. Furthermore, the distance between Origin$_1$ and Origin$_2$ is known as a matter of stereoscopic imaging system design.

For a given point P, shown as 216 in FIG. 2, that is visible to both imaging systems at the same time, a light ray originating or reflecting from point P forms a known angle α at Origin$_1$ and a separate light ray originating or reflecting from point P forms a known angle β at Origin$_2$ by virtue of the characterized optical systems. The combination of a vector from Origin$_1$ to P, from Origin$_2$ to P, and the line between Origin$_1$ and Origin$_2$ forms a triangle 218. Side A is the distance from Origin$_1$ to P, side B is the distance from Origin$_2$ to P, and the length of the base is the known distance between origins Origin$_1$ and Origin$_2$. Regardless of whether the triangle is a right triangle or oblique triangle, a right triangle can be formed, for which the height H taken perpendicular to the base can be determined by the formula:

$$H = \frac{\text{base}(\sin\alpha)(\sin\beta)}{\sin(\alpha+\beta)}$$

$$A = \frac{H}{\sin\alpha}$$

and $$B = \frac{H}{\sin\beta}$$

Hence, the distances from the paired imaging subsystems of the stereoscopic imaging system to a point are found through calculating values using these formulas. A 3D model can thus be constructed by generating a point cloud of all commonly visible points. The collections of points are then associated with the real world structures and objects that the points represent. As an example, most walls are flat planar surfaces, so a collection of points that all reside on the same plane are collectively defined as a wall in the stereoscopic-3D photographic image set. Similarly, a volumetric object closer than the wall and on the floor plane is probably a piece of furniture like a chair, couch, table or other object. A simple rules-based system helps a user define the 3D model and objects in the space as identified in the point cloud.

A useful implementation of the present system and method involves stereoscopic-3D image data sets of the customer space covering omnidirectional fields-of-view. To create a highly realistic design, such image sets are acquired of the customer-specified space using high-resolution image capture devices capable of performing this function. The image capture process for an omnidirectional image set can be accomplished by example using any of the following systems or methods:

a) one or more stereoscopic-3D cameras, such as the Fujifilm™ REAL 3D W3, taking multiple shots systematically in various directions;
b) one or more high-resolution digital cameras or digital SLR cameras, such as the Nikon D8100 Digital SLR Camera, capturing left-eye and right-eye image pairs by pairing each image with another image taken offset by a set distance, taking many shots in various directions;
c) one or more high-resolution digital video cameras that are maneuvered through a plurality of positions so as to capture video whose individual frames can be used to construct numerous left-eye and right-eye image pairs covering an omnidirectional field-of-view;
d) an omnidirectional stereoscopic-3D imaging system such as described in Publication US200810298674 Stereoscopic Panoramic Imaging System; or
e) other film and digital cameras or scanning optical systems that combine alternative fields-of-view less than omnidirectional to collectively assemble an omnidirectional stereoscopic-3D image set.

Since the images are operated on through computation, any film images must be converted to digital form through scanning or other processes to provide a digital image file in machine-readable format.

It is also possible to create point clouds with known distances using structured light techniques, allowing the construction of 3D models for a space. Such a method does not readily produce stereoscopic-3D images suitable for customer viewing, although it is operable for some portions of the method.

Representative views of an object and the results of an interpolation process are shown in FIG. 3A. Perspective-3D photographs are used for this example, but the method is the same for stereoscopic-3D photographic images. A chair is used for this interior design example. Operations are performed on both right-eye and left-eye portions of the stereoscopic-3D images, but only one portion is shown in this illustration. Photograph 302 is a perspective-3D image representing a viewpoint of a physical object accessed from the plurality of captured images of the object. Photograph 304 is another perspective-3D image representing a nearby viewpoint of the object also accessed from the plurality of captured images of the object. With knowledge of dimensional metadata of the physical object, the user's selected positioning information, and the camera viewpoint information, a viewpoint program that is part of the system software uses two or more of the stored views closest to the calculated angle and orientation. Using these two views in this example, the viewpoint program produces a representative interpolated image corresponding to the user's positioning that reflects the correct view from the perspective of the image capture device. Photograph 306 is an example of what the left-eye or right-eye portion of a stereoscopic-3D photograph produced through interpolation would look like. Interpolation requires at least two images but could use more in its calculations.

Figure 3B:
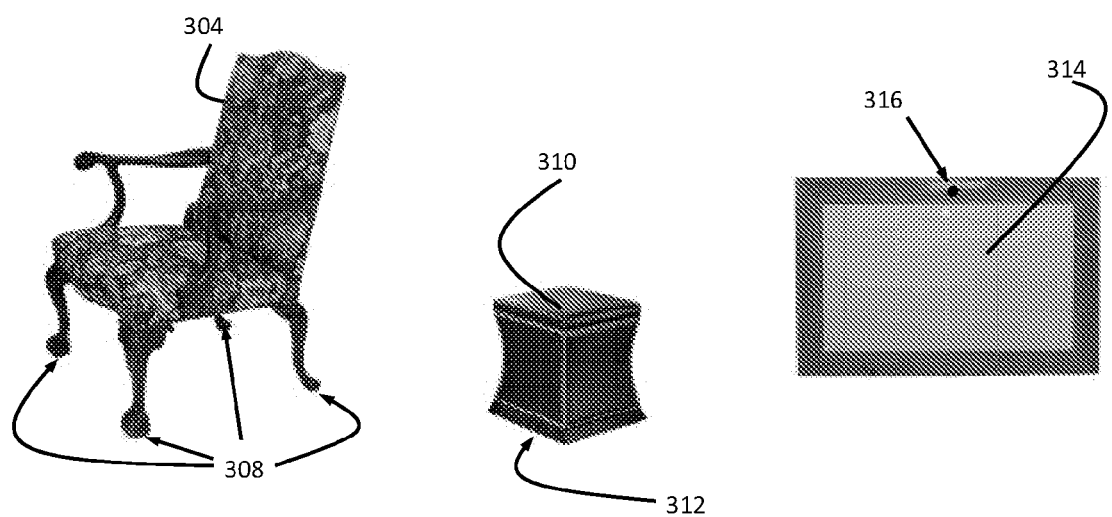
FIG. 3B illustrates examples of contact points and contact surfaces for sample types of furniture.
Figure 3C:
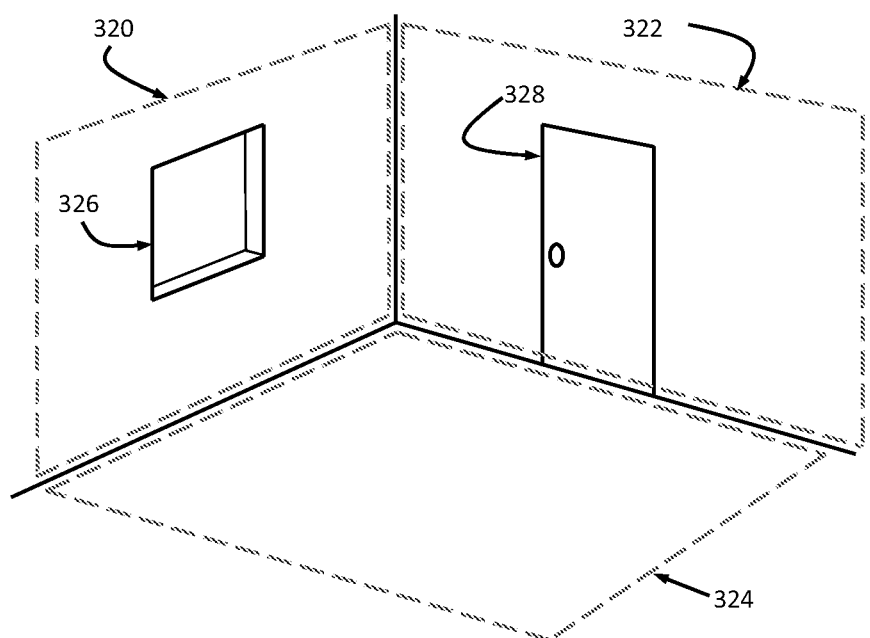
FIG. 3C illustrates examples of surfaces in an ordinary room that are represented by contact planes in the 3D model.

FIG. 3B illustrates contact points for representative pieces of furniture. Perspective-3D photographs are used for this example as in FIG. 3A, but the method is the same for stereoscopic-3D photographic images. Furniture, like many objects, has an up-and-down orientation with respect to its normal posture. Because of this orientation and gravity, furniture will usually make contact with its feet or bottom side on a traditional planar surface such as a floor. Four points 308 are examples of contact points in the perspective-3D image for a sample chair represented by photograph 304. These contact points are defined in relation to the 3D model of the object. An object may not have legs or feet, so it will make contact with another object or structure with a contact surface. The bottom 312 of an ottoman 310 is an example of a contact surface. Objects of a given type follow a defined convention in terms of their contact points, but additional or fewer contact points on other sides may alternatively be designated for a given piece of furniture. For example, item 314 is a perspective-3D image of the back side of a piece of art in a frame. A single contact point 316 at the top on the back of the artwork frame is an arbitrarily selected point that is used to associate the object with an appropriate planar surface, in this case a wall. The single contact point 316 is merely used as an example. FIG. 3C shows a diagram of an example room with wall contact planes 320 and 322, a floor or lower surface contact plane 324, a window contact plane 326 and a door contact plane 328. In another example, a ceiling or upper surface is a contact plane. A partition or room divider is not shown but could also be included as types of wall contact planes. Each of these contact planes in the 3D model represents a real world surface with which interior design objects potentially may be associated. The method is not limited to these examples. In a corresponding landscape design application, the floor contact plane would be replaced by the ground, and fences would correspond to wall contact planes.

Figure 4:
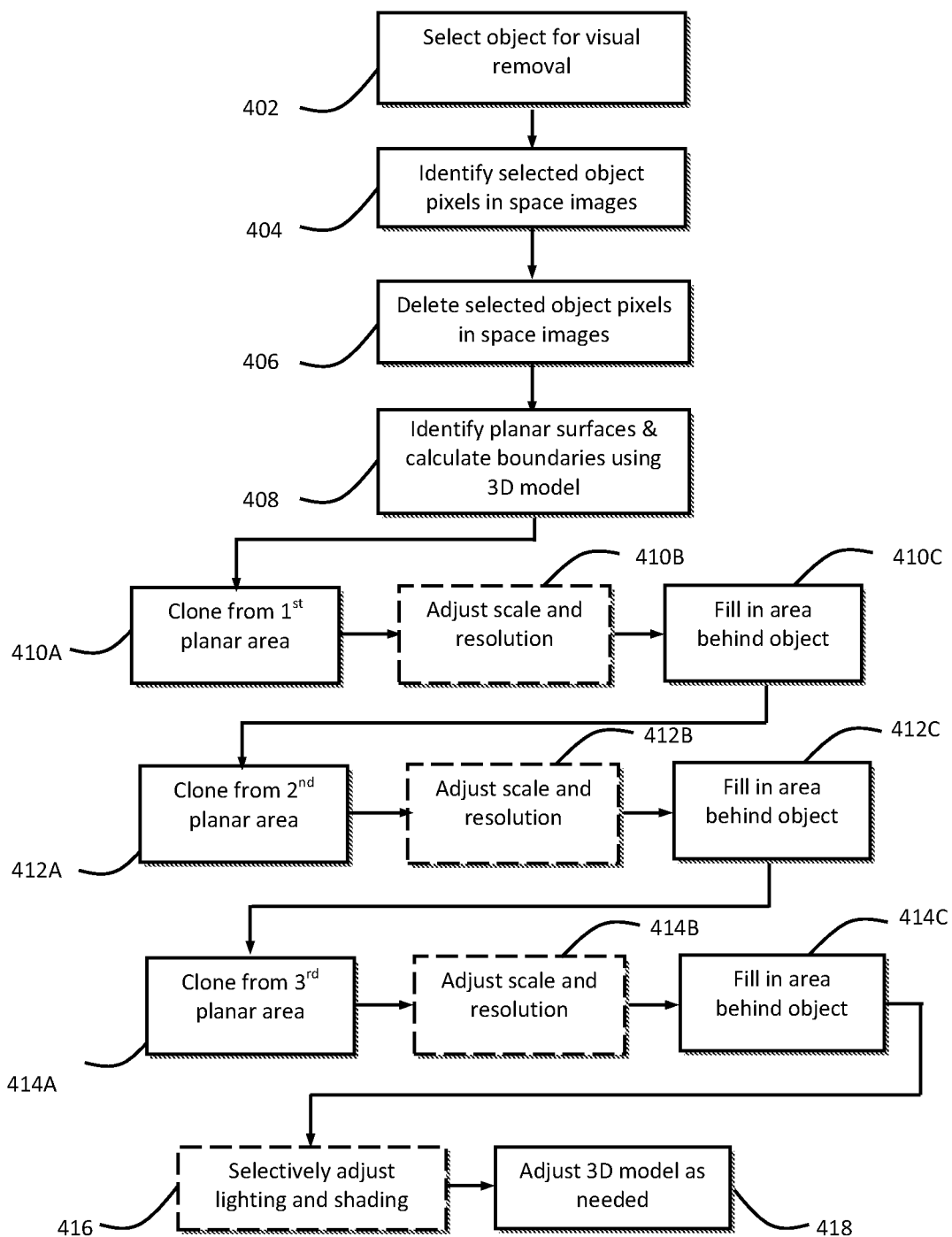
FIG. 4 shows the steps in the method of preparing realistic designs that allows the user to selectively remove visual objects from the images of the customer-specified space.

FIG. 4 illustrates one example of an automated method of removing images of visible objects from a stereoscopic-3D image and filling in imagery behind the objects. This description is given by way of example and is not the only method by which this action can be performed. Filling in visual content in place of a removed object is an optional action and not required but is shown in the FIG. 4 process. In addition to other possible program sequences or steps, manual modification of images through tools such as Photoshop™ (trademark of Adobe Inc.) accomplishes the same purpose. In an interior design example, an exemplar physical object such as a chair might exist in a room so as to partially obscure a wall, floor molding, and a floor from the viewpoint of an image capture device in a given spot. For this programming sequence example, a 3D model, point cloud or depth map has already been generated. It is understood that the stereoscopic-3D image capture device will not acquire views of areas behind objects. It is further understood that the complete shape of real physical objects cannot be fully known from a single stereoscopic-3D image. Further still, results may not be possible or absolutely accurate for filled-in surfaces of three-dimensional objects that are occluded from the image capture device's viewpoint by an object being removed. Notwithstanding these practical limitations, some presentation benefits are gained through this method. A user begins this process in step 402 by accessing and viewing an image, plan view, the 3D model or other representation of the real customer-specified space and selecting an object for removal. A chair is used as a representative object in this interior design example. In step 404, pixels are identified that are associated with the physical object (i.e. chair) in the left and right images of the stereoscopic-3D image subset. Discrimination between pixels that are associated and pixels that are not associated with the object is performed through analysis of the 3D model of the space containing the object. This analysis may be done by software located either locally or on a remote computing system, depending on the configuration of the system. Alternatively, selection of the object coupled with edge detection within the image is another technique by which discrimination of pixels is performed. Visual inspection and manual selection is yet another technique by which selection may be performed. The selected pixels are deleted from the images in step 406. The deletion process occurs for all images in the image set in which the removed object is initially visible. In step 408, system software determines all planar surfaces, edge treatments (e.g. moldings) and object surfaces behind the removed object based on visible elements. This is done through inspection of the 3D model of real space employed herein. From these actions, the software determines boundaries for different surface areas of various elements in the space. It should be noted that walls in practice may be curved and may not present a flat geometric plane in their entirety. In that case, the curved surface is nonetheless identified, and it is treated as piece-wise planar for purposes of this discussion such that the term "planar surfaces" can be used throughout in this limited context without confusion.

In step 410A, copying of a visible portion of a first matching background planar area (i.e. wall) clones sections of pixels from that area. The size of the cloned sections is adjustable and is made small enough that the result of the filling process is not distractingly noticeable. There are therefore numerous sections copied to fill the corresponding empty space. If needed, scale and resolution of each cloned section are adjusted in optional step 410B to match the projected portion of the planar surface into which they are being inserted. The cloned sections are then pasted into the left and right portions of the stereoscopic-3D image in blank areas corresponding to the planar surface up to planar boundaries in step 410C. Steps 412A-412C and 414A-414C repeat the process of steps 410A-410C for additional planar surfaces (e.g. the floor molding and floor) that have been occluded from the image capture device's view by the object (i.e. chair in this example). The inclusion of these steps is dependent on the position of the physical object being removed and the number of delineated surfaces previously occluded. For example, steps 412 and 414 are not necessary when framed artwork is removed from a wall since only one planar surface is affected. Similarly, objects existing in different locations may occlude more than 3 surfaces, so more of these steps may need to be repeated. This illustration is shown by example and is not limiting. The effects of light and shadows resulting from existing lighting in the image views are selectively adjusted in step 416. Lighting and shadow effects are consistent with the removed object no longer being present in the scene. The resultant photographic image set represents what the customer's space would look like if the identified physical object were not present. In step 418, the 3D model of real space is updated to reflect the removal of the object.

Figure 5:
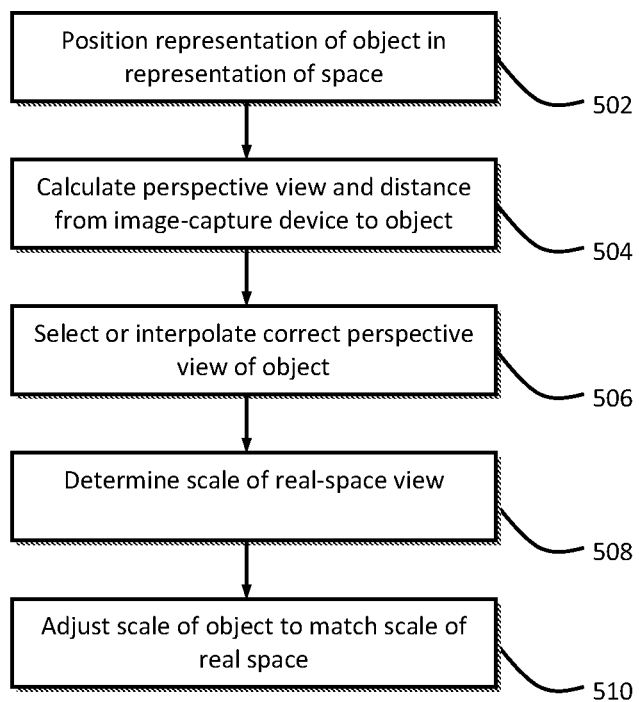
FIG. 5 shows the steps in the process of properly scaling images of physical objects for integration with images of real customer-specified spaces.

A properly-scaled object image is an accurate representation of the object's size in relation to the dimensions of the measured surroundings into which the object is being inserted. It is determined through a calculation using the object's metadata in conjunction with data from the 3D model of real space, camera viewpoint information and the user's positioning of the object in representation of the space. The scale of the object representation is adjusted to match the scale of the chosen location in the representation of the space by magnifying or shrinking the representation of the object accordingly. One example process for adjusting the scale of objects properly for their inserted positions in other images is described in FIG. 5. FIG. The dimensions of the space represented by the 3D model are known, as are the dimensions of the object. In step 502, which corresponds to step 118 in FIG. 1, the user selects a location for and positions a representation of the object in a plan view or representation of the space. The perspective view and distance from the image capture device to the object is determined through a simple calculation in step 504. In step 506, the view that will show the object to be integrated is either selected from the plurality of existing views or generated through interpolation of existing views of the object's stereoscopic-3D image set. This view is unique for a given position of image capture device and selected position of the inserted object. With known dimensions of the real space recorded in the 3D model, the image capture device optically characterized, and location and position of the image capture device known, the relative scale of the stereoscopic-3D photographic image subset for this view of the real space is determined in step 508. The relative size of the interpolated stereoscopic-3D image for the object being integrated is then adjusted to match the scale of the image of the space in step 510. The image of the object is then ready for resolution-matching.

Photographs can be displayed, printed and saved at a variety of resolutions. It is also known that the resolution of objects in an image differs across the image for wide-angle images. It is therefore possible to integrate images that have different resolutions, and this condition is often visually evident to trained observers. To that end, it is desirable when inserting visual elements from one photograph into other photographs to match the resolution of the component images to minimize the visibility of any resolution difference artifacts. In the present system and method, this is practiced in the integration of a stereoscopic-3D image of a real-world object into a stereoscopic-3D image of a real space.

Figure 6:
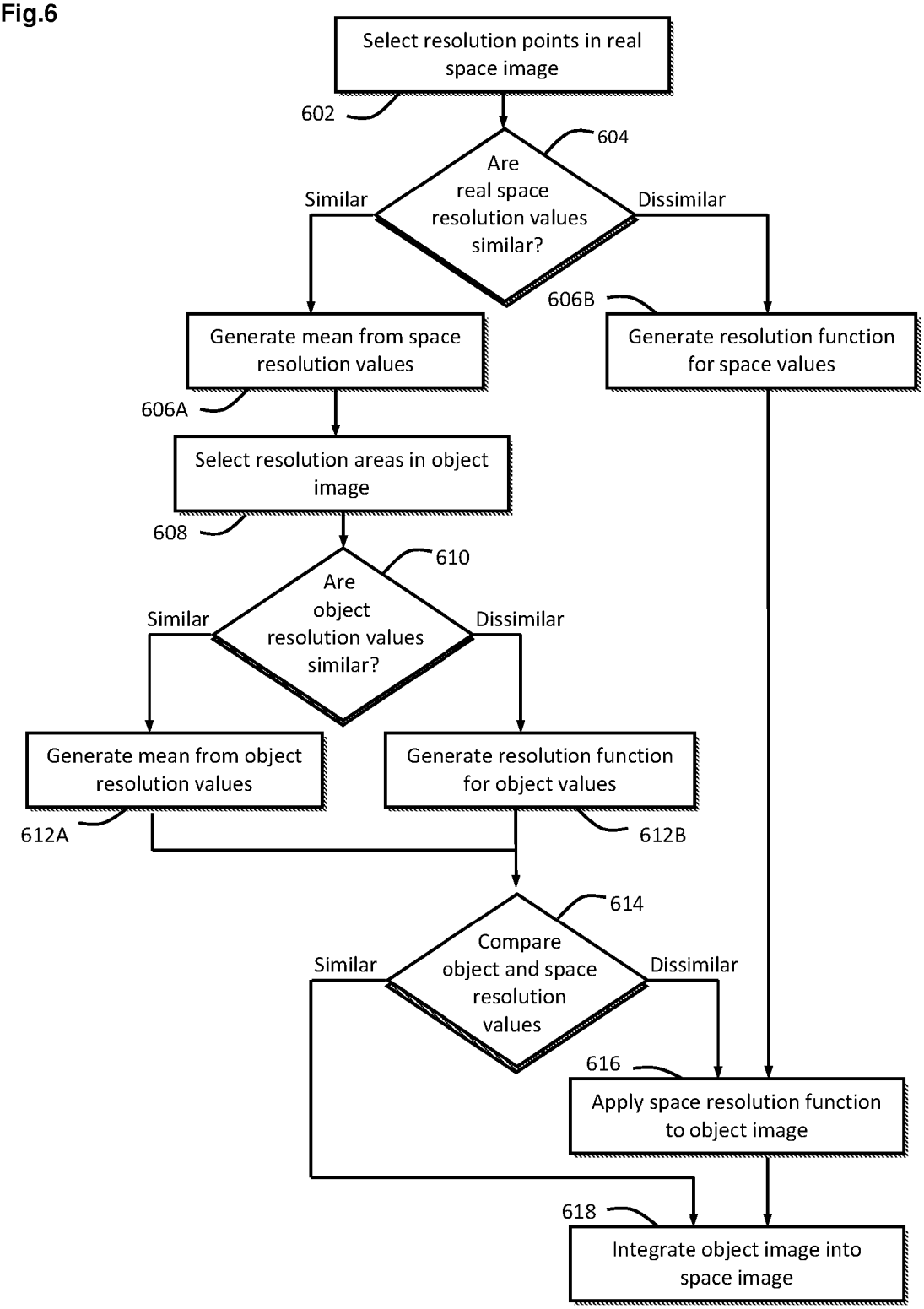
FIG. 6 shows the steps in the process for matching the resolution of images of physical objects for integration with the resolution for selected positions in images of customer-specified spaces.

Characterization of the image capture device provides numerical data allowing the creation of a 2-dimensional resolution map individually for each subset view of an omnidirectional image and for an object image. Operations are performed on both left-eye and right-eye parts of a stereoscopic-3D image. The process of adjusting resolutions originally identified as part of step 126 in FIG. 1 is described in more detail in FIG. 6. An appropriate viewpoint image matching the object's position in relation to the image capture device has already been generated in steps 122-124 of FIG. 1. In step 602, a number of points is selected in the left-eye or right-eye portion of the real space image distributed around the insertion location of the object image to be inserted. The respective resolution values for small areas around these points are determined. A calculation is performed in step 604 on this collection of resolution values to see if they are statistically similar. If a majority of the values is statistically similar, the system software generates an arithmetic mean from the values in step 606A. This represents the resolution of the real space image in the vicinity of the object image insertion area. If most of the values are statistically dissimilar to the norm, the system software generates a mathematical function representing the change in resolution over image area in step 606B. In step 608, the system software selects a number of small areas regularly distributed throughout the object within either the left-eye or right-eye portion of the object image, identifying their respective resolution values. A calculation is performed in step 610 on this collection of resolution values to determine if they are statistically similar. If most of the values are statistically similar, the system software generates an arithmetic mean from the values in step 612A that represents the resolution of the object image. If most of the values are statistically dissimilar to the norm, the system software generates a mathematical function representing the change in resolution over object image area in step 612B. A comparison of the values for the array of small areas within the object image and points around the object image in the space image is made in step 614. If the resolution values are sufficiently similar, no changes are made to the resolution of the object image, and it is integrated into its selected location in step 618. If the system software has generated a mathematical function representing the change in resolution over image area in step 606B, the mathematical function is applied to the resolution values of both left-eye and right-eye parts of the object image in step 616. Similarly, if the object and space resolution values are statistically dissimilar in step 614, the mathematical function derived from the space is applied to the resolution values of both parts of the object image in step 616. This is done in order to match the resolution of the embedded object with its surrounding image. Whether the resolution values of the object image are changed or not, the object image is integrated into its planned location in step 618. The process sequence illustrated in FIG. 6 is one possible implementation of this function. Other methods of resolution matching may alternatively be applied to image data sets to achieve the same results.

The viewing of displayed images resulting from the methods discussed herein is necessarily limited at a given instant in time to the field-of-view capabilities of a given display device. The viewing software and computing system format the field-of-view for each imaging subset based on the limitations of the display device and the choice of viewing direction selected by the user. In one implementation, the various image subsets that make up the omnidirectional stereoscopic-3D image sets are assembled into a unified image by image-stitching techniques known in the art, such as those described in the Wikipedia article on "Image Stitching" found at online encyclopedia (http://en.wikipedia.org/wiki/Image_stitching). However, that operation is not necessary to practice the defined system and method.

This method has been described in relation to an example related to interior design, but this is not a limiting requirement. The method is also applicable for the presentation of enhanced imagery for landscape architecture, advertising, product promotion, and other fields of endeavor.

Figure 7:
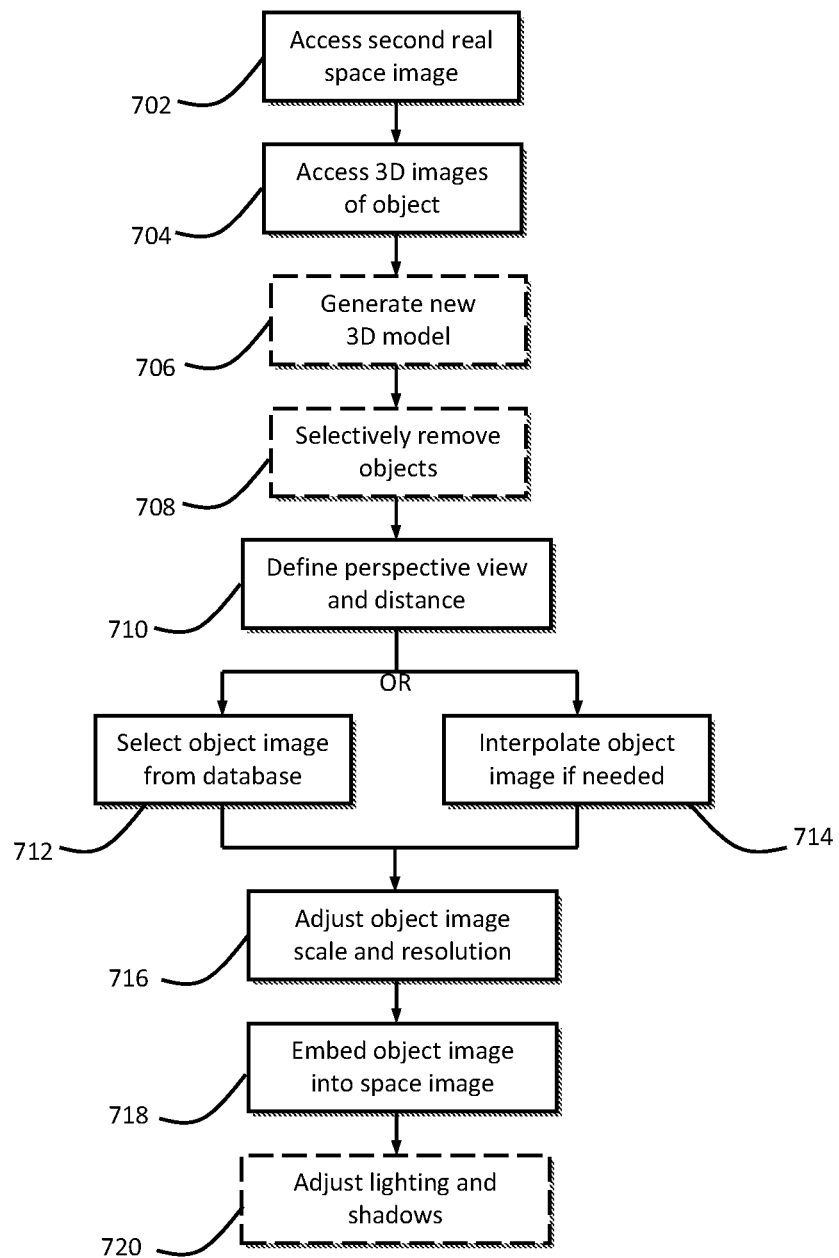
FIG. 7 shows the steps in another example of the method of preparing realistic designs in which additional photographs of the customer-specified space are generated within that space in an efficient manner.

Another example of a method is shown in FIG. 7. In this method, a user captures an additional stereoscopic-3D photographic image or image set of the customer-specified space from one or more different locations or positions of the image capture device within that space. The images acquired of this space are preferably omnidirectional in field-of-view. The present method is designed to take advantage of the existing 3D model of the space and the user's previous selection, locating and positioning choices of an object for integration in that space to streamline the preparation of additional integrated images. Alternatively, a new 3D model of the space can be generated selectively to combine with the first 3D model to refine the data. FIG. 7 illustrates the development of an additional omnidirectional image set into which an object image is integrated. The process is repeated for each additional image set that the user decides to capture. Since this is an additional image set of the real space, images of a selected object already exist in a database and a user has already defined positioning of the object. Step 702 therefore begins the process of this example by accessing a stereoscopic-3D image of the real space as taken from a new location or position. The location and height of the image capture device from which point the new omnidirectional image set is captured is included in the data for this image set. This camera viewpoint information includes the spatial location of the stereoscopic-3D image capture device in real space at its new position, its direction of view for a given subset of the omnidirectional image set, and resolution data for the background image view. If manual measurements have been employed, the angle-of-view of the image capture device for each image subset of the omnidirectional image set is also recorded with the image capture device's positional information. In step 704, the system software accesses stereoscopic-3D images of the previously-selected object.

A 3D model of the space exists from the first image set captured of the space, and the new image capture device location is identified within that model. The user may selectively choose to use that 3D model for expediency or may generate a new 3D model in step 706 from data derived at the $2^{nd}$ image capture location. Furthermore, in some cases, the user will have visually removed the image of a physical object from the first image set of the customer-specified space. Such an action would have selectively occurred in step 116 of FIG. 1. If an object has been selectively removed in a previous set of images, it is removed in this set as well in step 708 using the known 3D model and known location of the object in 3D space. 708 is shown as a selective operation based on a previous decision to delete the object or not. Since an object has already been positioned by the user in the previous operation outlined in FIG. 1, a similar step is not necessary in the process of FIG. 7. In step 710, the new camera viewpoint information combines user-selected object positioning information with the image capture device's new angle-of-view information to define the appropriate perspective view and distance from the image capture device to the physical object whose image is being integrated into the customer-specified space image. If the view that is needed matches an existing view of the object in the database, that view is selected in step 712. If the view that is needed does not match an existing object view in the database, a suitable stereoscopic-3D image is interpolated from two or more stereoscopic-3D images of the object in the database, as shown in 714. The viewpoint program performs calculations to generate an interpolated photographic image of the object from the closest approximate views of the multiple stereoscopic-3D images that have been stored for that object. As the new camera viewpoint information combines image capture device position information with information about the customer-selected object's position in the 3D space, step 716 is a calculation to adjust the scale and resolution of the new interpolated image to match the scale and resolution of its intended location in the 3D space. Once the stereoscopic-3D image of the object is thus adjusted, it is embedded in one or more stereoscopic-3D images in the image set of the real space as shown in 718.

As part of the embedding process, the system software determines whether occlusions exist for the view of the object being inserted based on its placement in the 3D space and the image capture device's vantage point. Based on this determination, the system software defines which pixels to include from each of the interpolated object image and the stereoscopic-3D image of the customer-specified space. The software recognizes the position and orientation of objects in the three-dimensional space in relation to the viewpoint of the image capture device, managing occluded views of each pixel as appropriate. Upon completion of the visual integration step, lighting and shadow effects related to the embedded object are selectively applied to the resultant stereoscopic-3D photographic image in step 720 to further enhance the realism of the image. The previous user selections and 3D model data have reduced the number of steps required to perform this operation, making the process for additional image sets of the customer-specified space more efficient. The result of steps in FIG. 7 is a stereoscopic-3D photographic image set of a customer's space from a new viewpoint with a user-selected, properly-scaled and resolution-matched object embedded into it.

The method of combining images of purchasable objects with actual customer space images is central to the method described. However, there is value in simply preparing and presenting stereoscopic-3D image and metadata information about objects even if a full design project is not immediately planned. Presentation of purchasable objects or goods in a compelling way often facilitates a later purchase decision. Some examples of objects for purchase are furniture, furnishing accessories, artwork, appliances, cabinetry, floor and wall coverings, countertops, doors, windows, shelving and color/texture treatments of surfaces, as well as bushes, flowering plants, trees, gazebos, fountains, walkways, fencing, patios and yard ornaments. This is not an exhaustive list but is representative of design objects and goods associated with the fields of interior and landscape design. The method is not limited to this set of objects but is also useful for automotive, boat or collectible sales or display of antiquities or historical items, among other purposes.

Commercial providers such as vendors, retailers and manufacturers strive to present their goods in a compelling way, but they are usually limited in the number of views they prepare due to the time and cost of preparation and the ongoing expense of managing the data. The method described herein reduces the number of images that must be captured, stored and managed while making an almost unlimited variety of views available to a user or prospective customer. It accomplishes this by capturing a number of compelling stereoscopic-3D photographic images of objects from multiple angles-of-view and interpolating intermediate views to satisfy customer or user requests.

Figure 8:
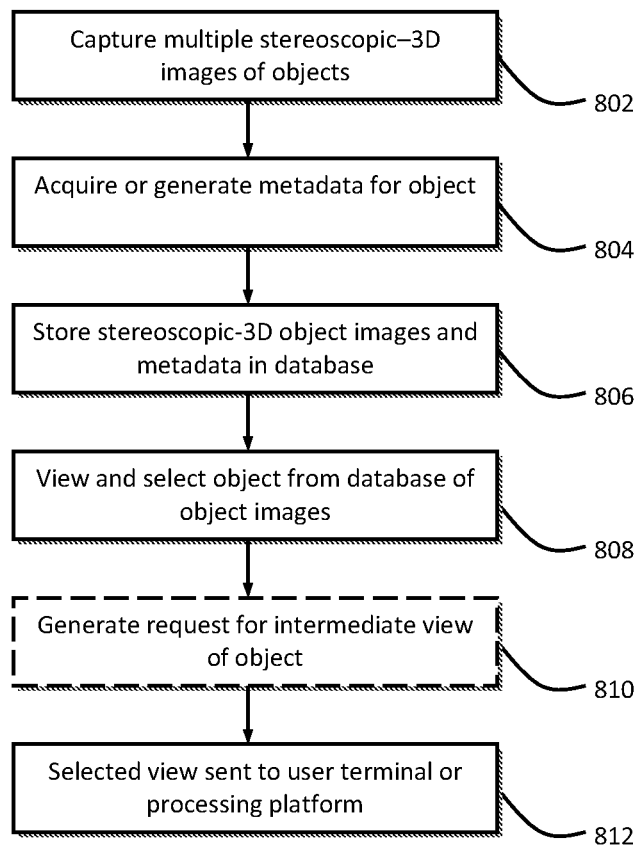
FIG. 8 diagrams a method of producing and managing photographic image and other data of real-world objects available for purchase.

FIG. 8 illustrates a method of presenting realistic image sets and other data of real-world objects available for purchase. This method begins with capturing stereoscopic-3D photographic images of physical objects from a plurality of perspectives in step 802. One technique for acquiring such multiple views is to place the object on a turntable and take photographs from various angles or elevations as the turntable rotates. There is no fixed number of images that must be acquired. At a minimum, all sides of an object except selectively a ground-upward view should be photographed, and even this view may be included as desired. In step 804, users or service providers gather or generate the descriptive data about the object that they think is most useful to support a purchase decision. Representative data given as examples includes dimensions, materials, finishes, manufacture date, price or availability, among other possible descriptors. The data is assembled as metadata to be associated with the image set for this particular object. The multiple images and the associated metadata are stored in a database that is widely accessible to prospective purchasers or other users, as shown in step 806. A database server connected to the Internet, for one example, achieves such accessibility. The accessibility also provides a convenient mechanism for the provider to maintain the accuracy and currency of the image sets and metadata. The multiple viewpoints of the object are selectively assembled into a QuickTimeVR object movie as a separate operation for an enhanced presentation modality. (QuickTimeVR is a trade name of Apple Inc.)

At a display terminal or other computing system with access to the database contents, a user chooses one or more items to view in step 808. The user is shown an initial viewpoint selected by the provider but may choose to see other viewpoints. This initial viewpoint is selectively in the form of a perspective-3D image, a wireframe or diagram of the object, a stereoscopic-3D image, or some other representation. A request for an intermediate view is selectively initiated in step 810. This can be accomplished directly by the user, or an automated program can initiate requests for intermediate views. Such a program is designed to generate one or more intermediate view images in anticipation of additional interest once a user has begun viewing an object. The user-selected or program-initiated viewpoint request causes a server associated with the image database to generate one or more intermediate views through interpolating between two or more of the stereoscopic-3D images available. Such images of the object have been previously captured from a number of perspectives. One or more intermediate images are transmitted to the user's terminal and are available for display on an immediate or delayed basis as shown in step 812. Such intermediate images are also selectively assembled with existing images to display additional presentation modalities like QuickTimeVR object movies. (QuickTimeVR is a trade name of Apple Inc.) The stereoscopic-3D photographic images are preferably presented to the user or others in stereoscopic-3D form using a display device capable of rendering true visual depth-of-field.

Figure 9:
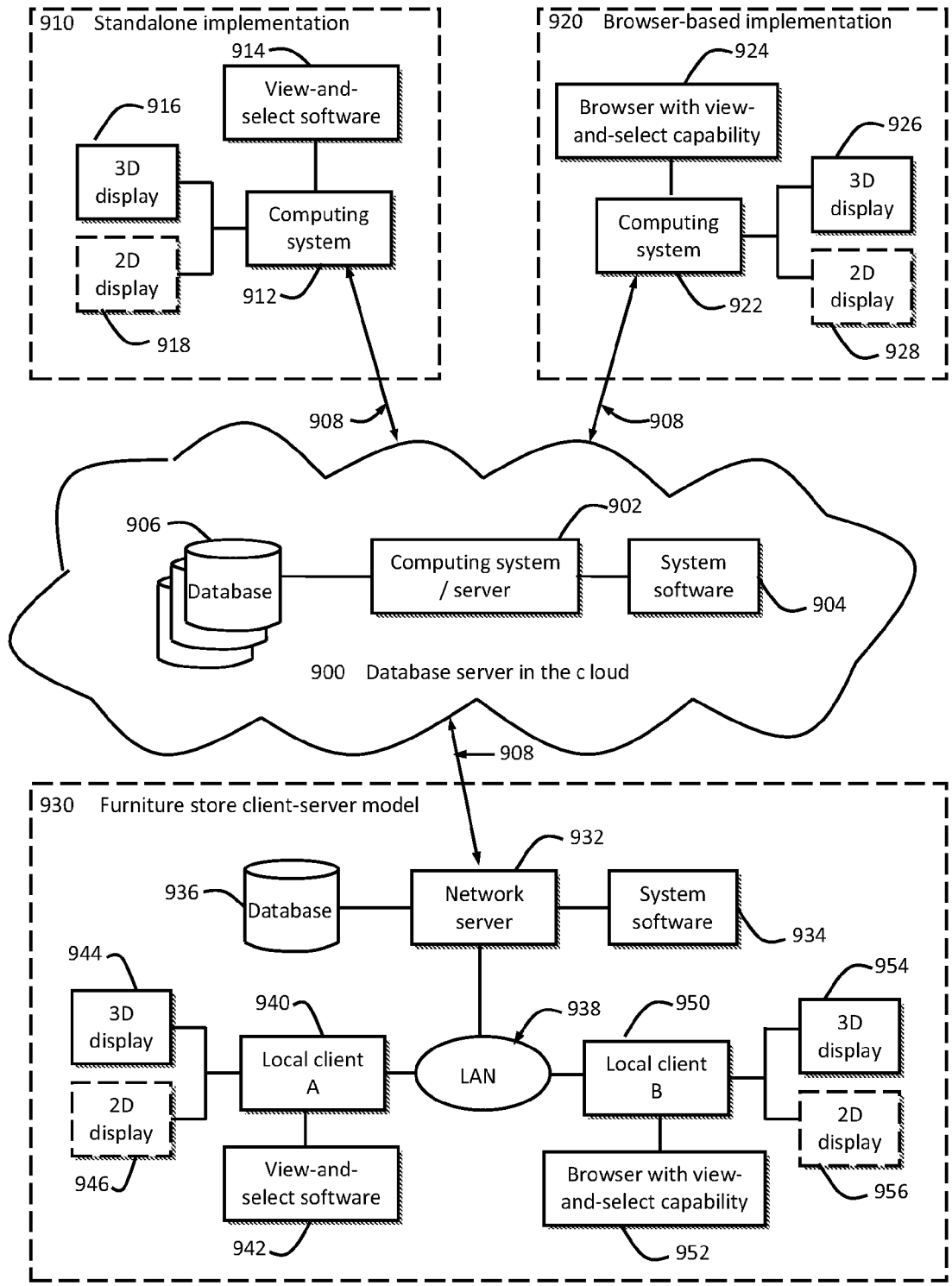
FIG. 9 illustrates various configurations of computing resources and system software as implemented according to this system and methodology.

FIG. 9 illustrates various configurations of computing resources and system software as implemented according to this system and methodology. The functions of the system can be configured alternatively in various hardware/software architectures as browser-based, client-server, cloud-based, or another configuration as may be preferred by client companies. In one implementation, one or more databases 906 house stereoscopic-3D images and metadata for the products of one or more companies. A computing system 902 is connected thereto and runs server software to manage the databases. The computing system 902 also operates the system software 904 that is involved in preparing and presenting interpolated images. Collectively identified as database server 900, this computing system, the databases and system software may be operated on behalf of other companies in order to provide services to them. Connections 908 to other systems are wide-area public or private networks.

In one implementation, a standalone system 910 could take the form of a personal computer, a laptop, a smart phone or other computing device. It is made of a computing system 912 that connects to database server 900 in order to access image data in databases 906. System 912 uses a standalone version of the system software 914 that facilitates users selecting objects visually from the databases, positioning them in other images, and presenting integrated images on 2D display 918 or 3D display 916. 2D display 918 is also selectively used for operating on image data prior to displaying in stereoscopic-3D format on 3D display 916. This version of system software 914 is also capable of performing interpolation and integration functions as defined herein. The distribution of system functions is defined in various forms as to be most effective in operation based on client preferences. For example, a client company may choose to keep its computing system costs low by providing entry level systems throughout its organization and paying a host company for managing the database and preparing images with the right viewpoints for a given image capture system position.

A similar low-cost configuration is browser-based implementation 920. In this implementation, computing system 922 connects to the database server 900 over network 908 (e.g. the Internet), and this version of the system software is configured as a browser with view-and-select capability 924. 924 may alternatively be configured as some variation of an SaaS (software-as-a-service) offering. Computing system 922 is alternatively implemented in hardware either as a stationary computer or portable computing device such as a tablet, laptop, smart phone, or other handheld or mobile computer that is preferably capable of displaying stereoscopic-3D images or driving a 3D display device. Depending on the model employed, 3D display 926 and 2D display 928 may alternatively be separate or integrated units or may be part of the portable computing system.

Yet another configuration is a client-server arrangement 930 that supports a client company hosting its own image database and selectively using databases 906 for secondary support, widespread consumer accessibility, or backup. In this client-server arrangement, network server 932 manages local image database 936 and operates system software 934 to perform its imaging functions. Local client A (item 940) is connected over wired or wireless LAN or other internal network 938 and employs a view-and-select version of the system software 942 that facilitates users selecting objects visually from the databases, positioning them in other images, and presenting integrated images on 2D display 946 or 3D display 944. Similarly, local client B (item 950) connects over internal network 938 and has system software that is configured as a browser or other client program with view-and-select capability 952. Client B selectively has a 2D display 956 attached to it and preferably has at least a 3D display 954 with which to show integrated photographic images. The important features of any implementation of the view-and-select portion of system software are accessibility of a user to its functions of viewing 2D and stereoscopic-3D images, selecting and positioning furniture, and viewing rooms and selectively modifying contents.

Figure 10:
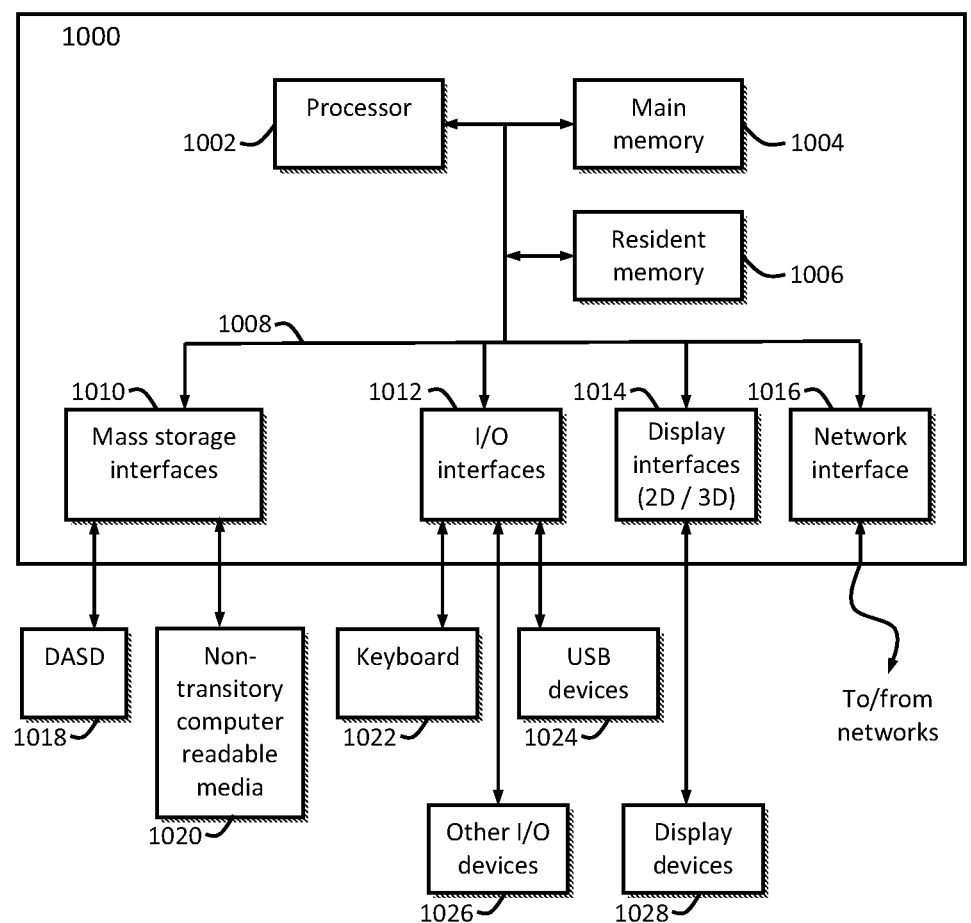
FIG. 10 illustrates a computing system as might be employed in this system.

FIG. 10 illustrates a computing system 1000 as might be employed in this system. A processor 1002 exchanges data with dynamic main memory 1004 and resident non-volatile memory 1006 over internal network 1008. Program memory typically operates from main memory, while basic instruction and command handling are typically performed using data stored in the resident memory. Various interfaces are also connected to internal network 1008. For example, DASD devices 1018 and non-transitory computer readable media 1020 exchange data through mass storage interfaces 1010. Keyboard 1022, USB devices 1024, and other I/O devices 1026 exchange data through I/O interfaces 1012. Both 2D and 3D displays 1028 connect through display interfaces 1014, while networks connect through network interface 1016, which may be multiple and may follow multiple standards.

The methods and system elements needed to practice the system and method defined herein also describe a method for processing image data of products and customer-specified locations and spaces. Such processing involves modifying the data in such a way as to show purchasable objects or goods in a prospective setting of a customer's choice in order to stimulate the customer to make a selection and purchase decision. In addition to the processing of image data, one implementation of the method supports transactions between providers of the purchasable goods, such as manufacturers or suppliers, and prospective purchasers. It provides this support by presenting such goods in a compelling way using stereoscopic-3D photographic images of the goods in spaces of specific interest to the customer.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Non-Limiting Examples

Although specific implementations of the subject matter have been disclosed, those having ordinary skill in the art will understand that changes can be made to these examples without departing from the spirit and scope of the disclosed subject matter. The scope of the disclosure is not to be restricted, therefore, to the specific examples, and it is intended that the appended claims cover any and all such applications, modifications, and embodiments within the scope of the present disclosure.

What is claimed is:

1. A method of presenting realistic images of a real space and physical objects, the method comprising:
    accessing at least one stereoscopic 3D image of a real space;
    accessing a plurality of stereoscopic 3D images of at least one physical object previously photographically captured from a plurality of perspectives;
    generating at least one 3D model from image data sets of the real space;
    positioning a representative image of the physical object in a representative image of the real space;
    defining a perspective view and distance of the physical object from an image capture device;
    selecting at least one stereoscopic 3D image of the physical object from a database and selectively interpolating an image corresponding to the perspective view;
    adjusting a scale and resolution of the stereoscopic 3D image of the physical object being inserted to match the scale and resolution of a selected location within the 3D image of the real space;
    embedding the stereoscopic 3D image of the physical object that has been adjusted into the stereoscopic 3D image of the real space based on at least one of contact points and contact surfaces of the physical object; and
    selectively adjusting lighting and shadows related to the physical object that has been embedded.

2. The method of claim 1, wherein the 3D model is derived from stereoscopic 3D images of the real space and the at least one physical object.

3. The method of claim 1, wherein the stereoscopic 3D image of the real space is omnidirectional in its field of view.

4. The method of claim 1, wherein a view of the physical object is interpolated from at least 2 stereoscopic 3D images stored in a database, the view corresponding to a selected position of the physical object as it would be placed in the real space.

5. The method of claim 1, further comprising:
defining at least one contact plane in the 3D model, wherein the embedding of the stereoscopic 3D image of the physical object that has been adjusted into the stereoscopic 3D image of the real space is based on associating at least one of the contact points and contact surfaces of the physical object to one or more contact planes or contact surfaces in the 3D model.

6. The method of claim 5, wherein the contact plane represents one of a floor, a lower surface, a ceiling, an upper surface, a wall, a door, and a window.

7. The method of claim 5, further comprising:
calculating a coordinate location of at least one object in the real space, wherein the embedding of the stereoscopic 3D image of the physical object that has been adjusted into the stereoscopic 3D image of the real space is non-overlapping for represented planes and objects in the real space.

8. The method of claim 1, wherein a user selectively removes images of visible objects from the stereoscopic 3D image of the real space and selectively fills in visual content using the 3D model of the real space to determine surfaces from which to derive content.

9. The method of claim 1, further comprising:
accessing a stereoscopic 3D image of the real space from at least one of a second image capture device location and a second image capture device position;
defining a perspective view and distance of the physical object from an image capture device;
selecting at least one stereoscopic 3D image of the physical object from a database and selectively interpolating an image corresponding to the perspective view;
adjusting a scale and resolution of the stereoscopic 3D image of the physical object to match the scale and resolution of a coordinate location within the stereoscopic 3D image of the real space; and
embedding the stereoscopic 3D image of the physical object that has been adjusted into the stereoscopic 3D image of the real space based on a previous location selected by a user and on contact points or contact surfaces of the physical object; and
selectively adjusting lighting and shadows related to the physical object that has been embedded.

10. A system for presenting realistic images of real spaces and physical objects, the system comprising:
a memory;
a processor communicatively coupled to the memory, wherein the processor is programmed for
accessing at least one stereoscopic 3D image of a real space;
accessing a plurality of stereoscopic 3D images of at least one physical object previously photographically captured from a plurality of perspectives;
generating at least one 3D model from image data sets of the real space;
positioning a representative image of the physical object in a representative image of the real space;
defining a perspective view and distance of the physical object from an image capture device;
selecting at least one stereoscopic 3D image of the physical object from a database and selectively interpolating an image corresponding to the perspective view;
adjusting a scale and resolution of the stereoscopic 3D image of the physical object being inserted to match the scale and resolution of a selected location within the 3D image of the real space;
embedding the stereoscopic 3D image of the physical object that has been adjusted into the stereoscopic 3D image of the real space based on at least one of contact points and contact surfaces of the physical object; and
selectively adjusting lighting and shadows related to the physical object that has been embedded.

11. The system of claim 10, wherein the 3D model is derived from stereoscopic 3D images of the real space and real objects.

12. The system of claim 10, wherein the stereoscopic 3D image of the real space is omnidirectional in its field of view.

13. The system of claim 10, wherein a view of the physical object is interpolated from at least 2 stereoscopic 3D images stored in a database, the view corresponding to a selected position of the physical object as it would be placed in the real space.

14. The system of claim 10, further comprising:
defining at least one contact plane in the 3D model, wherein the embedding of the stereoscopic 3D image of the physical object that has been adjusted into the stereoscopic 3D image of the real space is based on associating at least one of the contact points and contact surfaces of the physical object to one or more contact planes or contact surfaces in the 3D model.

15. The system of claim 14, wherein the contact plane represents one of a floor, a lower surface, a ceiling, an upper surface, a wall, a door, and window.

16. The system of claim 14, further comprising:
calculating a coordinate location of at least one object in the real space, wherein the embedding of the stereoscopic 3D image of the physical object that has been adjusted into the stereoscopic 3D image of the real space is non-overlapping for represented planes and objects in the real space.

17. The system of claim 10, wherein a user selectively removes images of visible objects from the stereoscopic 3D image of the real space and selectively fills in visual content using the 3D model of the real space to determine surfaces from which to derive content.

18. The system of claim 10, further comprising:
accessing a stereoscopic 3D image of the real space from at least one of a second image capture device location and a second image capture device position;
defining a perspective view and distance of the physical object from an image capture device;
selecting at least one stereoscopic 3D image of the physical object from a database and selectively interpolating an image corresponding to the perspective view;
adjusting a scale and resolution of the stereoscopic 3D image of the physical object to match the scale and resolution of a coordinate location within the stereoscopic 3D image of the real space; and
embedding the stereoscopic 3D image of the physical object that has been adjusted into the stereoscopic 3D image of the real space based on a previous location selected by a user and on contact points or contact surfaces of the physical object; and
selectively adjusting lighting and shadows related to the physical object that has been embedded.

19. A non-transitory tangible computer readable medium encoded with a program for presenting realistic images of real spaces and physical objects, the program comprising instructions for performing the steps of:
- accessing at least one stereoscopic 3D image of a real space;
- accessing a plurality of stereoscopic 3D images of at least one physical object previously photographically captured from a plurality of perspectives;
- generating at least one 3D model from image data sets of the real space;
- positioning a representative image of the physical object in a representative image of the real space;
- defining a perspective view and distance of the physical object from an image capture device;
- selecting at least one stereoscopic 3D image of the physical object from a database and selectively interpolating an image corresponding to the perspective view;
- adjusting a scale and resolution of the stereoscopic 3D image of the physical object being inserted to match the scale and resolution of a selected location within the 3D image of the real space;
- embedding the stereoscopic 3D image of the physical object that has been adjusted into the stereoscopic 3D image of the real space based on at least one of contact points and contact surfaces of the physical object; and
- selectively adjusting lighting and shadows related to the physical object that has been embedded.

20. The non-transitory tangible computer readable medium of claim 19, wherein the 3D model is derived from stereoscopic 3D images of the real space and physical objects.

* * * * *